United States Patent [19]

Stuart

[11] Patent Number: 5,982,143
[45] Date of Patent: Nov. 9, 1999

[54] BATTERY EQUALIZATION CIRCUIT WITH RAMP CONVERTER AND SELECTIVE OUTPUTS

[75] Inventor: Thomas A. Stuart, Maumee, Ohio

[73] Assignee: The University of Toledo, Toledo, Ohio

[21] Appl. No.: 08/857,410

[22] Filed: May 16, 1997

Related U.S. Application Data

[63] Continuation-in-part of application No. 08/703,445, Aug. 27, 1996, Pat. No. 5,666,041.

[51] Int. Cl.⁶ .................. H01M 10/44; H01M 10/46; H02J 7/00
[52] U.S. Cl. .................................. 320/119; 320/122
[58] Field of Search ........................... 320/116, 117, 320/118, 119, 121, 122, FOR 104, FOR 114, FOR 115, FOR 117, DIG. 29

[56] References Cited

U.S. PATENT DOCUMENTS

| | | |
|---|---|---|
| 3,413,536 | 11/1968 | Webb . |
| 3,930,192 | 12/1975 | Dinkler . |
| 4,238,721 | 12/1980 | DeLuca et al. . |
| 4,290,007 | 9/1981 | Fisher et al. . |
| 4,331,911 | 5/1982 | Park . |
| 4,346,339 | 8/1982 | Lewandowski . |
| 4,467,265 | 8/1984 | Hierholzer, Jr. . |
| 4,616,170 | 10/1986 | Urstoger . |
| 4,656,411 | 4/1987 | Carlson . |
| 4,748,342 | 5/1988 | Dijkmans . |
| 4,876,495 | 10/1989 | Palanisamy et al. . |
| 4,963,813 | 10/1990 | Bolle . |
| 4,967,136 | 10/1990 | Nofzinger . |
| 5,003,244 | 3/1991 | Davis, Jr. . |
| 5,063,340 | 11/1991 | Kalenowsky . |
| 5,146,150 | 9/1992 | Gyenes et al. . |
| 5,153,496 | 10/1992 | LaForge . |
| 5,304,917 | 4/1994 | Somerville . |
| 5,313,152 | 5/1994 | Wozniak et al. . |
| 5,387,857 | 2/1995 | Honda et al. . |
| 5,412,305 | 5/1995 | Jeanneret . |
| 5,438,250 | 8/1995 | Retzlaff . |

OTHER PUBLICATIONS

Nasser H. Kutkut et al., Charge Equalization for Series Connected Battery Strings, pp. 1–8 & 103. no date.

Nasser H. Kutkut et al., Design Considerations for Charge Equalization of an Electric Vehicle Battery System, pp. 96–102. 1995.

Bo Lindemark, Individual Cellvoltage Equalizers (ICE) for Reliable Battery Performance, pp. 196–201. 1991.

*Primary Examiner*—Edward H. Tso
*Attorney, Agent, or Firm*—MacMillan, Sobanski & Todd, LLC

[57] ABSTRACT

An electronic battery equalization circuit that equalizes the voltages of a plurality of series connected batteries in a battery pack. The current waveform is in the shape of a ramp for providing zero current switching. The transformer has a primary winding circuit and at least one secondary winding circuit. In one embodiment, each secondary winding circuit is connected to a different pair of batteries. The equalizing current is provided to the lowest voltage batteries in one half of the battery pack during one half of the charging cycle. The equalizing current is then provided to the lowest voltage batteries in the other half of the battery pack during the other half of the charging cycle. In another embodiment, each secondary winding circuit is connected to a different single battery. The equalizing current is supplied to a lowest voltage battery in the battery pack during each half of the switching cycle. The electronic battery equalization circuit also includes a feedback control circuit coupled to the primary winding circuit for controlling the current from the equalizing current supply source. In another embodiment, optically coupled switches are connected to a battery voltage monitor to provide equalizing current to the lowest voltage even and odd numbered battery in the battery pack.

17 Claims, 10 Drawing Sheets

500ns/div

BATTERY EQUALIZATION CIRCUIT WITH RAMP CONVERTER AND SELECTIVE OUTPUTS

CROSS-NOTING TO RELATED APPLICATIONS

This application is a continuation-in-part of patent application, entitled "Battery Equalization Circuit With Ramp Converter", Ser. No. 08/703,445 filed Aug. 27, 1996 now U.S. Pat. No. 5,666,041.

BACKGROUND OF THE INVENTION

1. Field of the Invention

The invention relates in general to a battery voltage equalization circuit, and in particular, to a battery voltage equalization circuit using a ramp converter.

2. Related Art

It appears that battery packs consisting of several 12V batteries connected in series to provide a 300–400 V.dc power source, for example, will probably be the most popular battery pack for electric vehicles (EV's) and hybrid electric vehicles (HEV's)

Unfortunately, slight variations exist between individual batteries, and after several charge-discharge cycles, the battery voltages between the individual batteries begin to vary. If a battery voltage becomes too high during charging, the battery can no longer store all of the input charge, and "gassing" and overheating may occur. Gassing represents a loss of an electrolyte, and the overheating is detrimental to the electrodes. If a battery voltage becomes too low during discharge, the acidic concentration of the electrolyte may be diminished to a very low level. This can also damage the electrodes and shorten battery life.

To avoid these problems, a battery management system may be used to monitor the voltages of the individual batteries and take corrective action when any of these voltages reach their high or low limit. Corrective action consists of stopping the discharge at the lower limit and decreasing or stopping the charge at the higher limit. However, this also means a single low voltage battery can force a premature shutdown and greatly diminish the range of the vehicle. Likewise, a single high voltage can force a reduction in charging current and greatly increase the required charging time. Therefore, it is important to incorporate some equalization process for keeping all of the battery voltages close to the same value.

There are a wide variety of equalization strategies and an even wider variety of implementations, some of which will be described below. The high current portion of the charge period is called the "bulk charge" since this is where the battery receives most of its energy. The remaining low current portion (perhaps 1 Ampere, or so) is called the "trickle charge."

The most common equalization method is to simply allow the batteries to trickle charge for a few hours after the bulk charge is complete. This low current increases the charge in the undercharged, low voltage batteries without causing excessive heating or gassing in the fully charged, high voltage batteries. This equalizing method is effective, but it requires an excessive charge time.

Electro-mechanical equalizers can be used to monitor all of the battery voltages and selectively connect the output of a transformer coupled DC—DC Converter to provide additional charge to the lowest voltage battery(s). These equalizers are so named because a set of electromechanical relays seems to be the most practical means of connecting the converter to the individual batteries. These units also are effective, but they are relatively complex and expensive.

Most electronic equalizers consist of a transformer coupled DC-DC converter with several secondary windings and rectifiers. Usually there is a separate secondary winding and rectifier for each battery, but other combinations are possible. The converter is operated in the constant current mode, and the circuit is arranged so that each battery is effectively connected in parallel with the converter output. This means the lower voltage batteries will "hog" the output current and thus receive an extra charge to increase their voltages. These equalizers are much simpler and cheaper than the electro-mechanical types, and tests indicate they can provide very effective equalization.

Although electronic equalizers offer certain advantages over the electromechanical variety, several of the previous units have fairly high switching losses, and the large number of secondary windings complicates the transformer construction.

SUMMARY OF THE INVENTION

To solve the foregoing problems, it is an object of the invention to provide a cost-effective electronic battery equalization circuit that has low losses and a decreased number of secondary windings.

To achieve these and other objectives, the invention is directed to an electronic battery equalization circuit for equalizing voltages of batteries in a battery pack. In the first preferred embodiment, the equalization circuit includes a current source for supplying a charging current during a first half cycle and a second half cycle, a transformer connected to the current source, a primary circuit connected to the transformer and at least one secondary circuit connected to said transformer. The primary circuit includes a primary winding, an inductor connected in series to the primary winding, a current transformer connected in series to the inductor and a pair of semiconductor devices, preferably field-effect transistors. The secondary circuit includes a secondary winding coupled to a different pair of batteries, a pair of diodes connected in series, each diode is connected to a different battery, and a capacitor connected across a different battery. The charging current from the current source is supplied to at least one battery in a first half of the battery pack during the first half cycle, and the charging current from the current source is supplied to at least one battery in a second half of the battery pack during the second half cycle.

The primary circuit also includes a negative feedback control circuit coupled to the current transformer. The negative feedback control circuit includes an error amplifier coupled to the current transformer, a voltage controlled oscillator coupled to the error amplifier and a driver coupled to the voltage controlled oscillator for outputting a drive signal to the pair of semiconductor devices. The error amplifier compares the charging current to a reference charging current and outputs a signal to the voltage controlled oscillator. The signal represents a difference between the charging current and the reference charging current.

A short circuit protection system is coupled to the feedback control circuit. The short circuit protection system includes a comparator connected to the transformer for comparing a voltage from the transformer to a reference voltage. The short circuit protections system also includes an oscillator connected to the comparator for supplying an output signal being combined with the drive signal from the voltage controlled oscillator.

In a second preferred embodiment, the equalization circuit includes a current source for supplying a charging current during a first half cycle and a second half cycle, a transformer connected to the current source, a primary circuit connected to the transformer and at least one secondary circuit connected to the transformer. The primary circuit includes a primary winding, an inductor connected in series to the primary winding, a current transformer connected in series to the inductor and a pair of semiconductor devices. The secondary circuit includes a secondary winding coupled to a battery using a full wave rectifier and a capacitor connected across a battery. The charging current is supplied to the lowest voltage batteries in the battery pack during the first half cycle of the current source and the charging current is supplied to lowest voltage batteries in the battery pack during the second half cycle of the current source.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
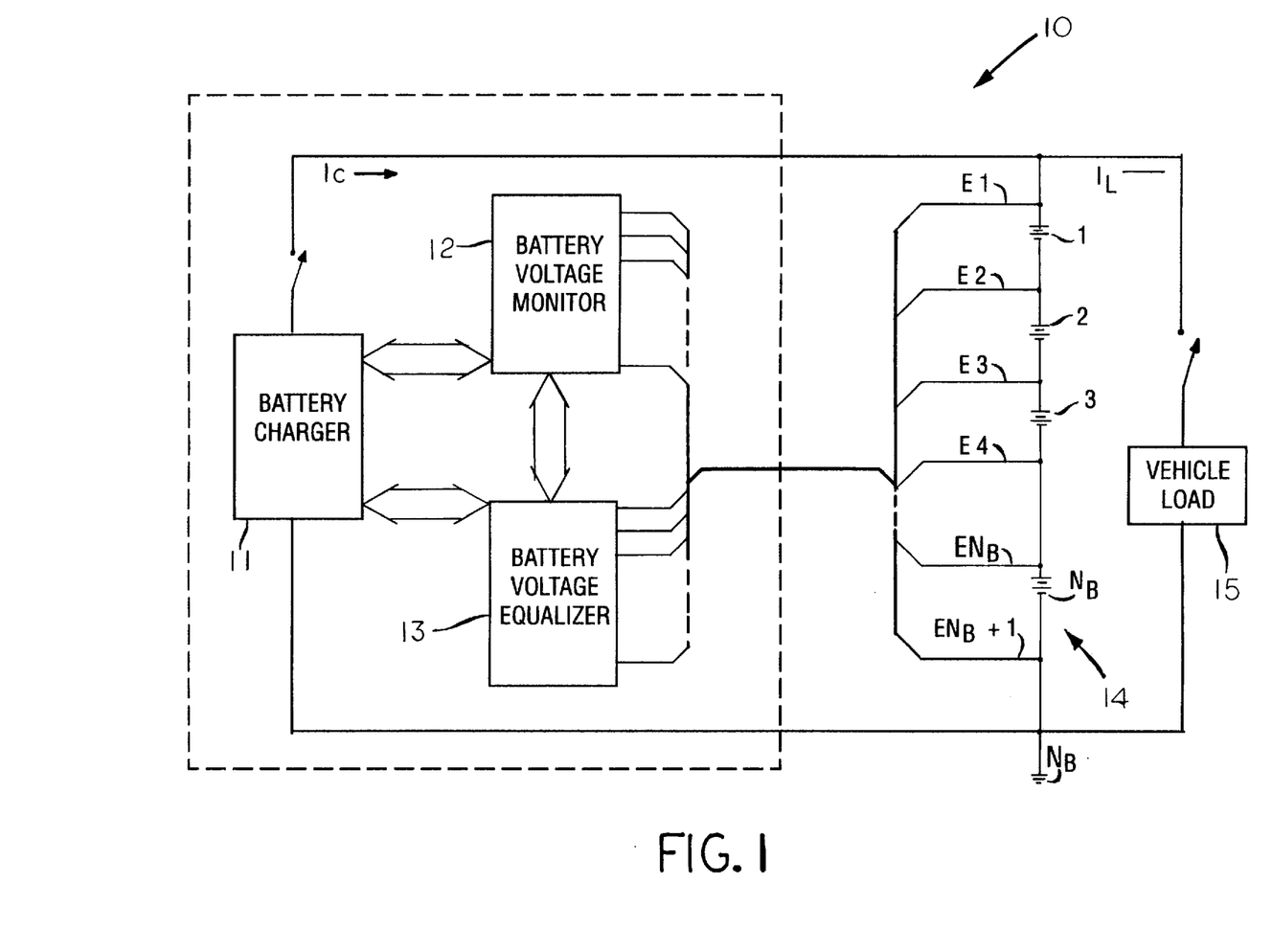
FIG. 1 shows a block diagram of a battery management system using an electronic battery equalization circuit.

FIG. 1 shows a block diagram of a battery management system 10. The battery management system 10 comprises a battery charger 11, a battery voltage monitor 12 and a battery voltage equalizer 13. Battery charger 11 supplies a charging current or equalizing current, $I_C$, to a battery pack 14 of $N_B$ batteries supplying electrical power to a load 15. Battery voltage monitor 12 monitors the voltages, E1, . . . , $EN_B$, of the individual $N_B$ batteries and takes corrective action when any of these voltages reach their high or low predetermined limit. Corrective action consists of stopping the discharge at the lower limit and decreasing or stopping the charge at the higher limit.

As described below, during all phases of operation, battery voltage equalizer 13 equalizes the voltages of battery pack 14 using an electronic battery equalization circuit according to preferred embodiments of the invention. Thus, the voltages of battery pack 14 can be equalized by the battery voltage equalizer 13 while the batteries of battery pack 14 are charging, discharging or at rest. It should also be appreciated that the invention is not limited by the equalizing current being supplied by battery charger 11 and that the invention can also be practiced by supplying electrical current from any external source or even from battery pack 14.

Figure 2:
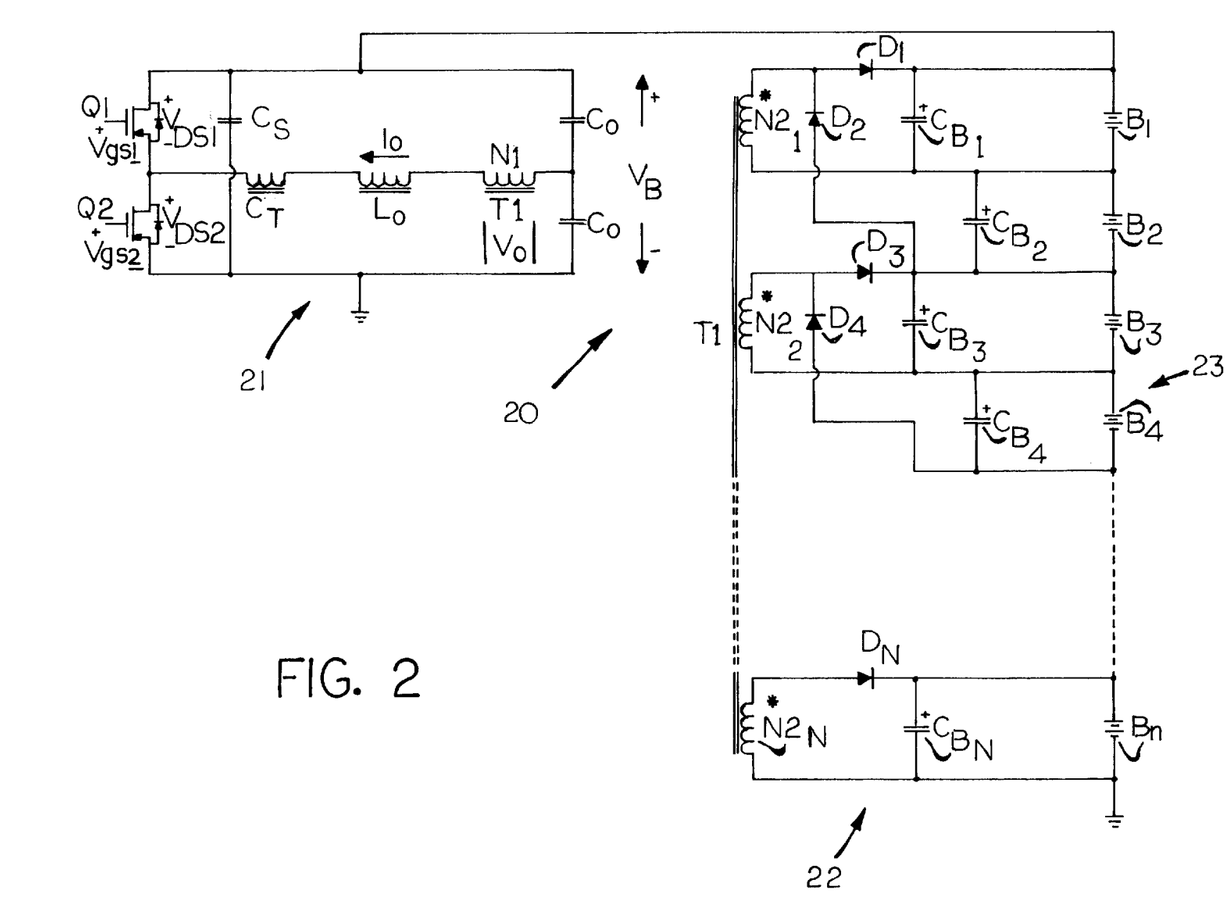
FIG. 2 shows a diagram of the electronic battery equalization circuit according to a first preferred embodiment of the invention.

FIG. 2 shows a diagram of the electronic battery equalization circuit 20 according to a first preferred embodiment of the invention. In general, the electronic battery equalization circuit 20 includes a number of batteries, $B_1, \ldots, B_n$, connected in series and a primary circuit 21 with a transformer, T1, and at least one secondary winding, $N_{21}, \ldots, N_{2N}$, connected to a secondary circuit 22. Primary circuit 21 includes a half-bridge circuit including a primary winding, $N_1$, an inductor, Lo connected in series to primary winding, $N_1$, a current transformer, $C_T$, connected in series to inductor, $L_o$, and a pair of semiconductor devices, Q1, preferably field-effect transistors (FET's). Primary winding circuit 21 also includes a pair of capacitors, $C_o$, to provide a path for current, $i_o$, and a capacitor, $C_s$, to minimize the effect of stray inductance. Secondary circuit 22 includes a number of secondary windings, $N_{21}, \ldots, N_{2N}$, a number of output diodes, $D_1, \ldots, D_n$, and a number of capacitors, $C_1, \ldots, C_{BN}$. Each diode, $D_1, \ldots, D_n$, is connected in series to a different battery, $B_1, \ldots, B_n$. Each capacitor, $C_1, \ldots, C_{BN}$, is coupled across a different battery, $B_1, \ldots, B_n$.

An important transformer simplification feature of the invention is the number of secondary windings $N_{21}, \ldots, N_{2N}$ required for the electronic equalization circuit 20 of the first preferred embodiment. The arrangement requires only one secondary winding for each pair of batteries. In other words, secondary winding, $N_{21}$, for example, is required for batteries $B_1$ and $B_2$. If the total number of batteries, $B_N$, is equal to an odd number, for example, twenty-seven, one of the secondary windings, for example, $N_{2N}$, is connected to battery $B_n$ as shown in FIG. 2. However, if the total number of batteries, $B_N$, is equal to an even number, equalization circuit 20 would be the same as shown in FIG. 2, except secondary winding, $N_{2N}$, would be connected to the last two batteries, $B_{N-1}$ and $B_N$, in the same way that the top secondary winding, $N_{21}$, connects to the first two batteries, $B_1$ and $B_2$. The electronic battery equalization circuit 20 is only operated in the constant current mode and batteries $B_1, \ldots, B_n$ limit the maximum output voltage of equalization circuit 20. Capacitors $C_B$ are required to minimize the effect of the stray inductance of the leads connected to batteries $B_1, \ldots, B_n$ and to reduce the electromagnetic interference (EMI) caused by the currents in these leads.

As illustrated in FIG. 2, the arrangement between secondary windings $N_{21}, \ldots, N_{2N}$, rectifiers or output diodes $D_1, \ldots, D_n$ and batteries $B_1, \ldots, B_n$ is such that the instantaneous current, $i_o$, is supplied to the lowest voltage batteries of one half of the battery pack 23, and in particular, to the odd numbered battery(s) ($B_1$, $B_3$, . . . ), on the semiconductor device Q1 half cycle. Likewise, current, $i_o$, is supplied to a lowest voltage battery of the other half of the battery pack 23, and in particular, to the even numbered battery(s) ($B_2$, $B_4$, . . . ), on the semiconductor device Q2 half cycle.

This advantage of the invention is quite important in light of the large number of batteries in some applications. When charging twenty seven (27) batteries, for example, conventional battery equalization circuits use one secondary winding and one rectifier bridge with four diodes for each battery. Thus, conventional equalization circuits require 27 secondary windings and 108 output diodes. In contrast, the battery equalization circuit 20 of the invention needs only 14 secondary windings and 27 output diodes. Thus, the battery equalization circuit 20 of the invention decreases the number of secondary windings $N_{21}$, . . . , $N_{2N}$ by approximately 50% and the number of output diodes $D_1$, . . . , $D_n$ by approximately 75% as compared to conventional equalization circuits using one secondary winding and one rectifier bridge for each battery.

The battery equalization circuit 20 shown in FIG. 2 is a current source, a half-bridge converter with an inductance, $L_o$, in series with the primary winding, $N_1$, of a transformer, T1, to provide a high output impedance. The average current, $I_o$, is regulated by increasing the switching frequency, $f_s$, if the average current, $I_o$, attempts to increase. The topology bears some resemblance to a series loaded resonant (SLR) converter operated above the resonant frequency, $f_o$. However, capacitors $C_o$ are so large that their voltage, $V_B/2$, is almost constant and the current waveform is a ramp shape. As a result, the electronic battery equalization circuit 20 of the invention includes a ramp converter power circuit minimizing the voltages across inductor $L_o$ and capacitors $C_o$. This arrangement also insures an adequate energy of $\frac{1}{2}L_o I_p^2$ to provide zero voltage switching (ZVS) for semiconductor devices Q1 and Q2.

Electronic battery equalization circuit 20 uses frequency modulation to regulate the average primary current, $I_o$, and thus the sum of the rectified average secondary currents. As described in more detail below, soft switching or zero voltage switching (ZVS) is employed so that all of the semiconductor devices, Q1, Q2, $D_1$, . . . , $D_n$, have zero voltage switching (ZVS) and/or zero current switching (ZCS) at both turn-on and turn-off. Because of these low switching losses, fairly high frequencies can be used by battery equalization circuit 20 of the invention, and the size of the heat sinks and reactive components required by using the invention are minimized.

To avoid the excessively high $L_o$ and $C_o$ voltages that would otherwise result if $f_s$ approaches $f_o$, the switching frequency, $f_s$, is purposely selected so that, $$f_s \gg f_o = \frac{1}{2\pi\sqrt{2L_o C_o}} \tag{1}$$

where, $f_s$=switching frequency,
$f_o$=resonant frequency,
$L_o$=inductance of inductor, $L_o$, and
$C_o$=capacitance of capacitor, $C_o$.

Figure 3:
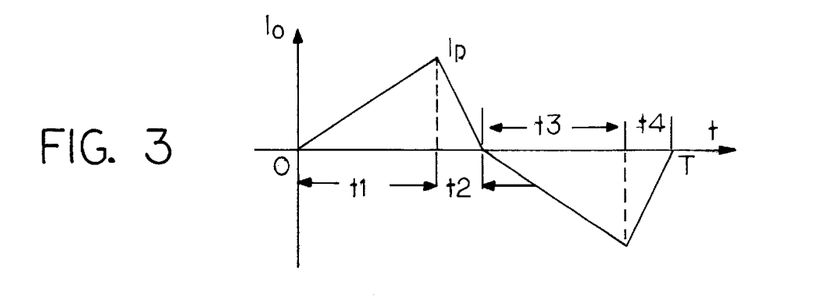
FIG. 3 shows a graph of the primary current waveform.
Figure 4:
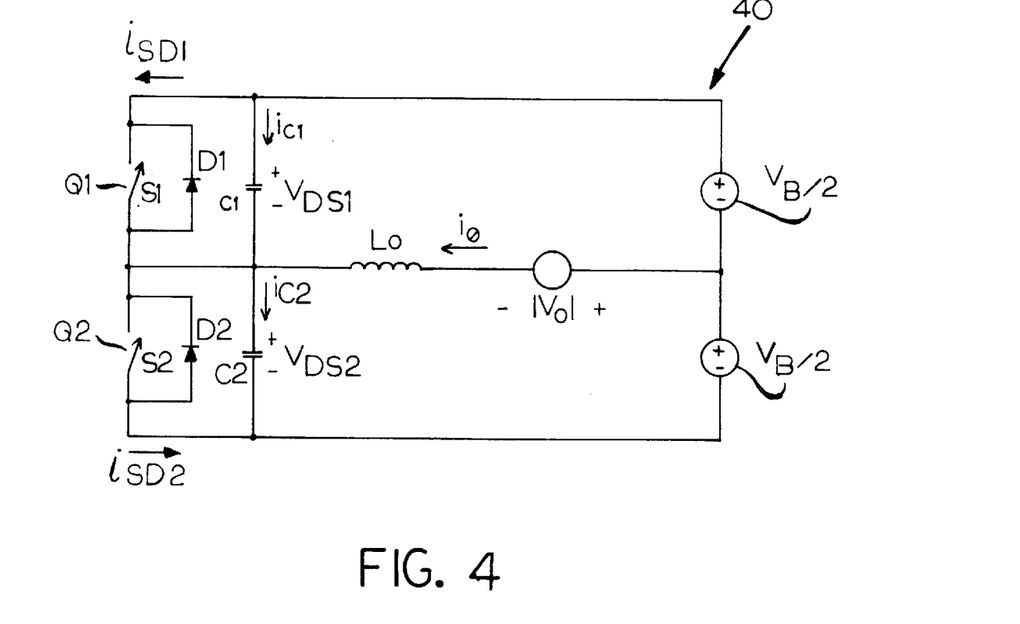
FIG. 4 shows a diagram of an equivalent circuit of the electronic battery equalization circuit of FIG. 2.

Referring now to FIGS. 3 and 4, the shape of the waveform of primary current, $i_o$, and a more detailed description of the zero voltage switching (ZVS) will now be described. As shown in FIG. 3, the shape of the waveform for primary current, $i_o$, is a ramp shape. FIG. 4 illustrates an ideal circuit 40 of primary circuit 21 of FIG. 2. In FIG. 4, semiconductor device Q1 of primary circuit 21 is represented by an ideal switch S1 in parallel with its parasitic diode, D1', and output capacitance, C1. Likewise, semiconductor device Q2 of primary circuit 21 is represented by an ideal switch S2 in parallel with its parasitic diode, D2', and output capacitance, C2. Each capacitor $C_o$ of primary circuit 21 is represented by a constant voltage source, $V_B/2$, and the voltage across transformer T1 of primary circuit 21 is represented by a constant voltage source, $|V_0|$, that always opposes current $i_o$.

On a typical half-cycle, semiconductor device Q2 turns on at t=0 and turns off at a predetermined time interval, $t_1$. When semiconductor device Q2 turns off, current is diverted through the parasitic diode, D1', in parallel with semiconductor device Q1, and the current decreases until it reaches zero (0) at time $t_1+t_2$. Then, semiconductor device Q1 turns on at $t_1+t_2$ starting the next half-cycle and turns off at time $t_1+t_2+t_3$. When semiconductor device Q1 turns off, current is diverted through parasitic diode D2' in parallel with semiconductor device Q2, and the current reaches zero (0) at a predetermined time, T, equal to $t_1+t_2+t_3+t_4$. Secondary winding circuits $N_{21}$, . . . , $N_{2N}$ are configured such that an odd numbered battery, ($B_1$, $B_3$, . . . ), with the lowest voltages will "hog" the current on the semiconductor device Q1 half-cycle, and the even numbered batteries, ($B_2$, $B_4$, . . . ), will do likewise on the semiconductor device Q2 half-cycle.

Since the switching frequency, $f_s$, is purposely selected so that $f_s \gg f_o$, it is reasonable to assume that the voltage across capacitors $C_o$ of primary circuit 21 is almost constant. Thus, from the current waveform of FIG. 3 we have, $$I_p = \left(\frac{0.5V_B - |V_o|}{L_o}\right)t_1 \tag{2}$$

$$I_p = \left(\frac{0.5V_B + |V_o|}{L_o}\right)t_2 \tag{3}$$

where, $I_p$=primary current,
$V_B$=source voltage,
$V_o$=voltage across the primary of T1,
$t_1$=first time interval, and
$t_2$=second time interval.

Therefore, $$\frac{T_{SN}}{2} = t_1 + t_2 \equiv L_o I_p\left(\frac{V_B}{.25V_B^2 V_o^2}\right) \tag{4}$$

where, $T_{SN}$=total time period during a normal circuit.
Since the rectified average $i_o \equiv I_o = I_p/2$, then $$T_{SN} = \frac{4L_o I_o V_B}{.25V_B^2 V_o^2} = \frac{1}{f_s} \tag{5}$$

where, $f_s$=switching frequency.
In the extreme case where one output winding is shorted and $V_o$=0 in Equation (5), then $$T_{sc} = \frac{16L_o I_o}{V_B} = \frac{1}{f_{sc}} \quad (6)$$

where, $T_{SC}$=total time period during a short circuit, $f_{sc}$=frequency during the short circuit.

Therefore, from Equations (5) and (6), $$\frac{(0.25)V_B^2 V_o^2}{4L_o I_o V_B} < f_s < \frac{V_B}{16L_o I_o} \quad (7)$$

If the voltage drops of diodes D1' and D2' and semiconductor devices Q1 and Q2 are ignored, then $$|V_o| = nV_{Bi} \quad (8)$$

$$I_E = nI_o \quad (9)$$

$$V_s = N_B V_{Bi} \quad (10)$$

where, n≡turns ratio, $N_B$≡number of batteries, $V_{Bi}$≡individual low battery voltage, and $I_E$≡sum of the average battery equalization currents.

Therefore, from Equations (7) through (10), $$\frac{n(.25N_B^2 - n^2)V_{BMIN}}{4L_o I_E N_B} < f_s < \frac{nN_B V_{BMAX}}{16L_o I_E} \quad (11)$$

Equation (11) indicates that the turns ratio, n, of transformer T1 can be selected to limit the necessary range for the switching frequency, $f_s$.

Figure 5:
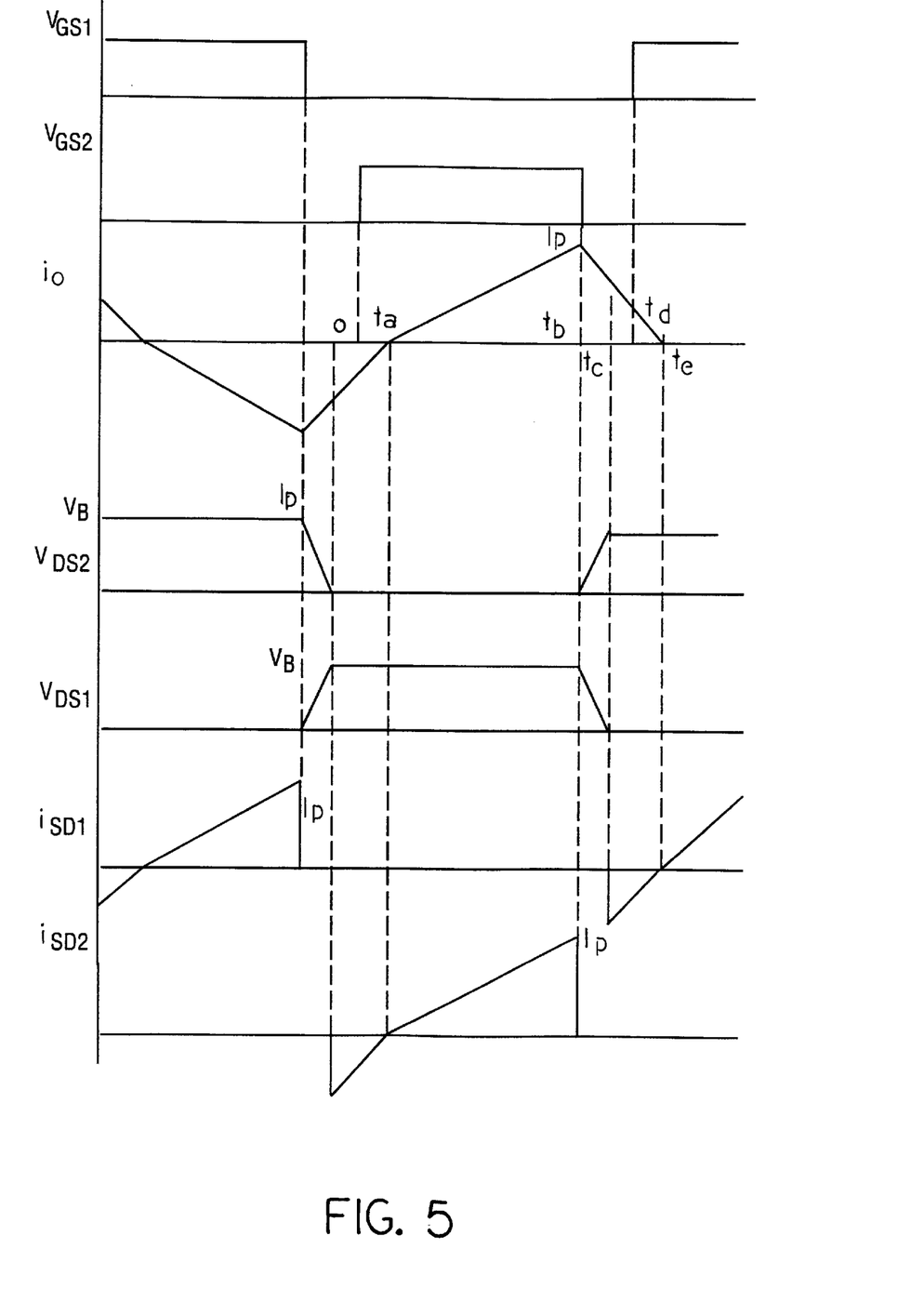
FIG. 5 shows a graph of idealized waveforms of the equivalent circuit of FIG. 4.

FIG. 5 shows the idealized waveforms for the equalization circuit 40 of FIG. 4. The drive signal, $V_{GS2}$, turns on semiconductor device Q2 at t=0, which is modeled by closing ideal switch S2. However, since $i_0$ is still flowing in the negative direction through parasitic diode D2', $i_{SD2}$ remains negative until $i_0$ reverses at $t_a$. $i_{SD2}$ and $i_0$ are still identical at this point and increase until $V_{GS2}$=0 at $t_b$, which means that ideal switch S2 is open. Now that both switches S1 and S2 are open, current is diverted through capacitors C1 and C2 until $V_{DS2}=V_B$ and $V_{DS1}=0$ at $t_c$. At this time, $i_o$ diverts through parasitic diode D1' and still flows when $V_{GS1}$ turns on switch S1 at $t_d$. Even though switch S1 was closed at $t_d$, $i_{SD1}$ cannot begin to flow in the positive direction until $i_0$ reaches zero (0) at $t_e$. In this manner, the invention provides a zero voltage switching (ZVS) action because the voltage across switches S1 and S2 is always zero when they are opened or closed.

This ZVS action depends on the following conditions:

(1) The stored energy equal to $\frac{1}{2}L_o I_p^2$ must be adequate to charge both capacitors C1 and C2 after each switch S1 and S2 turn off;

(2) The gaps between $V_{GS1}$ and $V_{GS2}$ must be long enough to allow both capacitors C1 and C2 to charge; and (3) The positive oncoming current, $i_{SD}$, must start immediately after current, $i_0$, reaches zero to prevent partial discharge of capacitors C1 and C2 before the start of the next half cycle.

In the invention, the average primary current, $I_o$ is substantially constant, which is equivalent to regulating the sum of the secondary currents. The voltage across the primary winding, $N_1$, of transformer T1, $V_0$, is limited by the reflected individual battery voltage. It is recommended that these required conditions can be achieved by using a variable frequency, $f_s$, to control the average primary current, $I_0$, such that:

$$\text{variable } f_s = \frac{1}{2t_d} \gg f_0 \quad (12)$$

and, $$t_g \equiv t_e - t_b \quad (13)$$

where, $t_g$ is a fixed gap.

Figure 6:
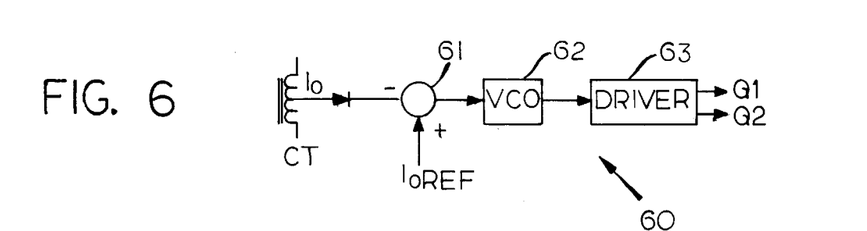
FIG. 6 shows a block diagram of a feedback control system.

FIG. 6 shows a block diagram of a negative feedback control circuit 60 coupled to current transformer, $C_T$. The control circuit 60 includes an error amplifier 61, a voltage controlled oscillator (VCO) 62 and a driver 63. Error amplifier 61 compares the primary current, $I_0$, with a reference current, $I_{OREF}$, and sends a difference signal to voltage controlled oscillator 62. Driver 63 drives semiconductor devices Q1 and Q2 based on the signal from voltage controlled oscillator 62. In this manner, if the primary current $I_0$ attempts to increase, the negative feedback control circuit 60 detects the difference between $I_0$ and $I_{0ref}$. This causes $f_s$ to increase, $t_b$ to decrease, and $I_0$ to decrease so that it approximately equals $I_{0ref}$. Thus, a variable switching frequency, $f_s$, is used in conjunction with the fixed gap, $t_g$, in the drive waveforms to regulate the average value of $i_o = I_o$. This insures ZVS will result over a wide range of battery voltages. An alternative method would be to use a fixed variable switching frequency, $f_s$, with pulse width modulation (PWM), but this entails a variable gap, and if the gap is too wide, it would be difficult to guarantee ZVS.

At high values of the switching frequency, $f_s$, most of the losses in DC—DC converters are usually the switching losses, $p_{S1}=i_{SD1} \times V_{DS1}$ and $P_{S2}=i_{SD2} \times V_{DS2}$, that occur when semiconductor devices Q1 and Q2 are turning on or off. However, in the invention, $V_{DS1} \cong 0$ whenever $i_{SD1} \neq 0$ and $V_{DS2} \cong 0$ whenever $i_{SD2} \neq 0$. Therefore, $p_{S1}=0$ and $p_{S2}=0$ as a result of zero voltage switching (ZVS). Because the switching losses are very low, the battery equalization circuit 20 of the invention can operate at very high values of $f_s$, for example, 300 kHz, without overheating semiconductor devices Q1 and Q2. This allows the use of very small components for $C_0$, $L_0$, $T_1$ and the heat sinks for semiconductor devices Q1 and Q2. As a result, the size and cost of the electronic battery equalization circuit 20 is reduced.

Typically, the parasitic capacitances of capacitors C1 and C2 are large enough to provide a good approximation to ZVS when semiconductor devices Q1 and Q2 turn off. However, if this is not the case, capacitors C1 and C2 can be supplemented with discrete parallel capacitors (not shown).

Figure 7:
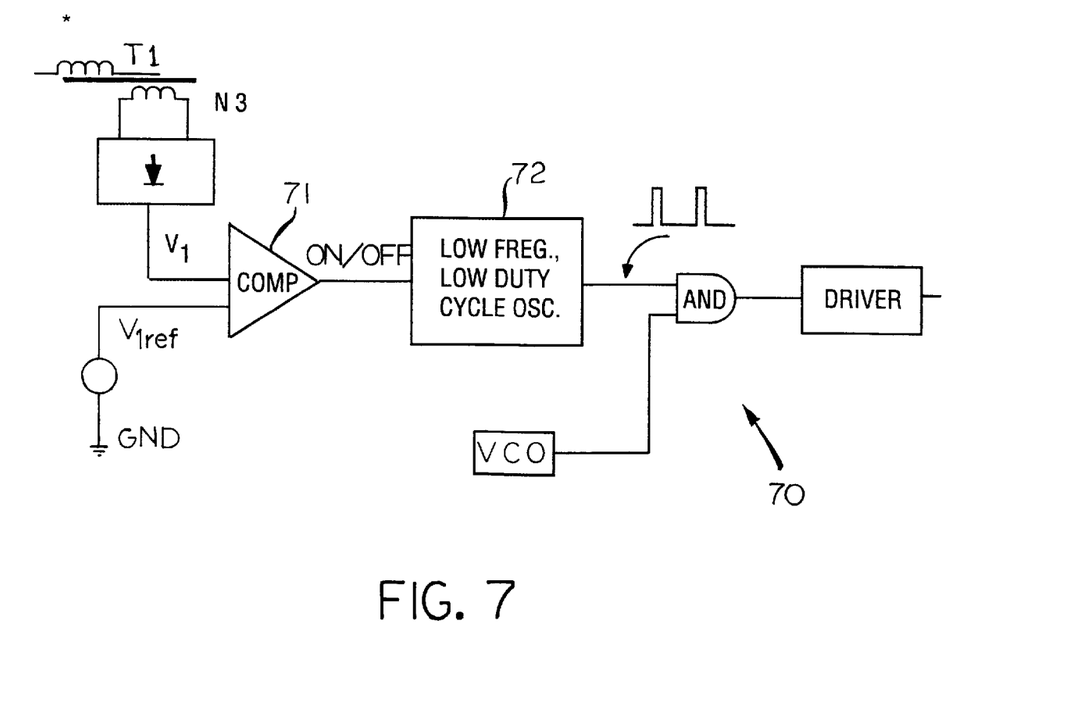
FIG. 7 shows a block diagram of a short circuit protection system.

During normal operation, the regulation of primary current $I_0$ also regulates the sum of the secondary currents. In the event one or more outputs are shorted, circulating output currents may develop that are much higher than the normal regulated sum ($I_0 N_1/N_2$). However, this condition can be avoided with the additional short circuit protection system 70 shown in FIG. 7. The short circuit protection system 70 uses an extra winding, N3, on transformer T1 to monitor the rectified average transformer voltage, $V_1$. During a short circuit across any output, $V_1$ will drop below a reference voltage, $V_{1ref}$, which turns on a comparator 71. The comparator 71 turns on a low frequency, low duty cycle oscillator 72 whose output is combined with the original FET drive signal. This forces the FET's, Q1 and Q2, to remain off during the off-time of this oscillator 72. The total duty cycle of each FET, Q1 and Q2, is now much lower, and the output current is reduced to a safe value while the short circuit is present.

Figure 8:
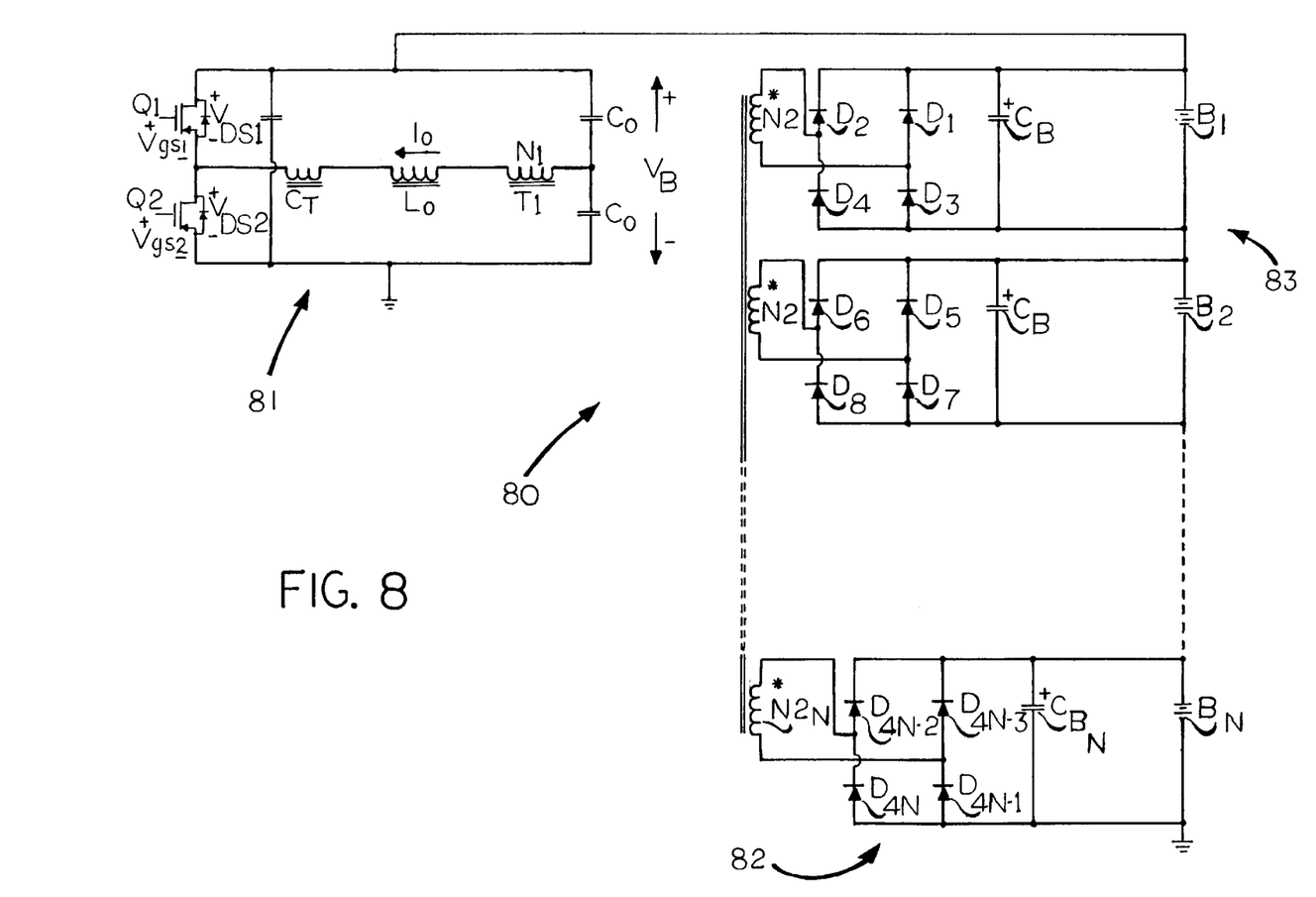
FIG. 8 shows a diagram of the electronic battery equalization circuit according to a second preferred embodiment of the invention.

A second preferred embodiment of the invention is illustrated in FIG. 8. The electronic battery equalization circuit 80 of the second preferred embodiment is identical to the equalization circuit 20 of the first preferred embodiment, except that each secondary winding circuit, $N_{21}, \ldots, N_{2N}$, is connected to a single battery.

As in the first embodiment, electronic battery equalization circuit 80 of the second embodiment includes a transformer, T1, a primary circuit 81 and at least one secondary circuit 82. The primary circuit 81 includes a half-bridge circuit including a primary winding, $N_1$, an inductor, $L_o$, connected in series to the primary winding, $N_1$, a current transformer, $C_T$, connected in series to the inductor, $L_o$, and a pair of semiconductor devices, Q1 and Q2, preferably field-effect transistors (FET's). The half-bridge circuit also includes a pair of capacitors, $C_o$, to provide a path for current, $i_o$, and a capacitor, $C_s$, to minimize the effect of stray inductance. For simplicity, the discussion of like components in the circuit 80 and the operation thereof for the second preferred embodiment is abbreviated.

Unlike the first embodiment, the secondary circuit 82 of the second embodiment includes a secondary winding, $N_2$, and output diodes, $D_1, \ldots, D_{4N}$, connected to batteries, $B_1, \ldots, B_N$, using a full wave rectifier. Thus, each secondary circuit 82 of the second embodiment requires four times as many output diodes, $D_1, \ldots, D_{4N}$, as in the first embodiment. Capacitors, $C_B, \ldots, C_{BN}$, are coupled across each battery, $B_1, \ldots, B_N$.

In addition, the arrangement between the secondary windings, $N_{21}, \ldots, N_{2N}$, the rectifiers or output diodes, $D_1, \ldots, D_{4N}$, and batteries, $B_1, \ldots, B_N$, is such that the current is supplied to the lowest voltage batteries of battery pack 83 on both the half cycles of semiconductor devices Q1 and Q2. In contrast, equalization circuit 20 of the first preferred embodiment supplied current to the lowest voltage batteries of one half of battery pack 23 (odd numbered batteries) during the first half cycle of current source 11 and to the lowest voltage batteries of the other half of battery pack 23 (even numbered batteries) during the second half cycle of current source 11.

To prove the principles of the invention, two tests using the electronic battery equalization circuit 20 of FIG. 2 were constructed to provide equalization for a set of twenty-seven (27) 12N85 Horizon lead acid batteries manufactured by Electrosource, Inc. The electronic battery equalization circuit 20 in the first test had a maximum power output of 30 W (15 W for odd numbered batteries and 15 W for even numbered), and operated at a nominal frequency of 220 kHz. The circuit parameters were as follows:

$10.5V \leq V_{Bi} \leq 15.5V$, $181 \text{ kHz} \leq f_s \leq 366 \text{ kHz}$, Efficiency=86%@$V_B$=400V, $N_B$=27, $I_E$=2A.dc, Co=0.68 μfd, $L_o$=250 μH, n=7:1, and $C_B$=100 μfd/25V.

The second test was identical to the first test except the maximum output power of circuit 20 was increased to 60 W, $I_E$=4A.dc and $L_o$=125 μH.

Figure 9:
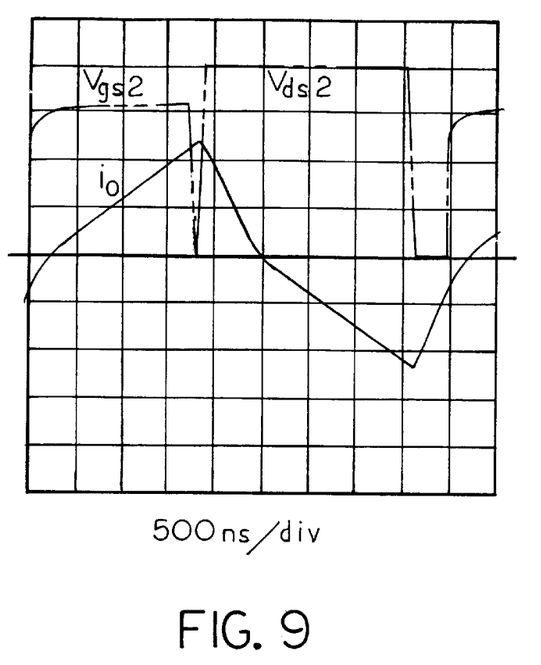
FIG. 9 shows a graph of waveforms for a 60-watt electronic battery equalization circuit using the invention.

FIG. 9 shows the waveforms for $i_o$, $V_{gs2}$ and $V_{ds2}$ for electronic battery equalization circuit 20 for the 60 W version of the second test. The waveforms shown in FIG. 9 are identical to those for the 30 W version, except $i_o$ is twice as large.

To evaluate this form of equalization, one of the original batteries, $B_1, \ldots, B_N$, was replaced with a defective battery, $B_{18}$, that did not match the characteristics of the others. When charging, the voltage of battery $B_{18}$ would tend to rise faster than the other batteries, $B_1, \ldots, B_N$, and on discharge its voltage would drop faster. A computer controlled charge and discharge system (not shown) similar to that in FIG. 1 was used to cycle the batteries, $B_1, \ldots, B_N$, in the following manner:

Charge: Max. charge current=$I_C$=18A.dc.

Max allowable battery voltage=15.5 V.dc.

$I_C$ is halved whenever the high battery voltage reaches 15.5V.

Charge time=4 hours

Discharge: Discharge current=85A.dc

Min. allowable battery voltage=11.5 V.dc.

Discharge is terminated whenever the lowest battery voltage reaches 11.5V.

Figure 10:
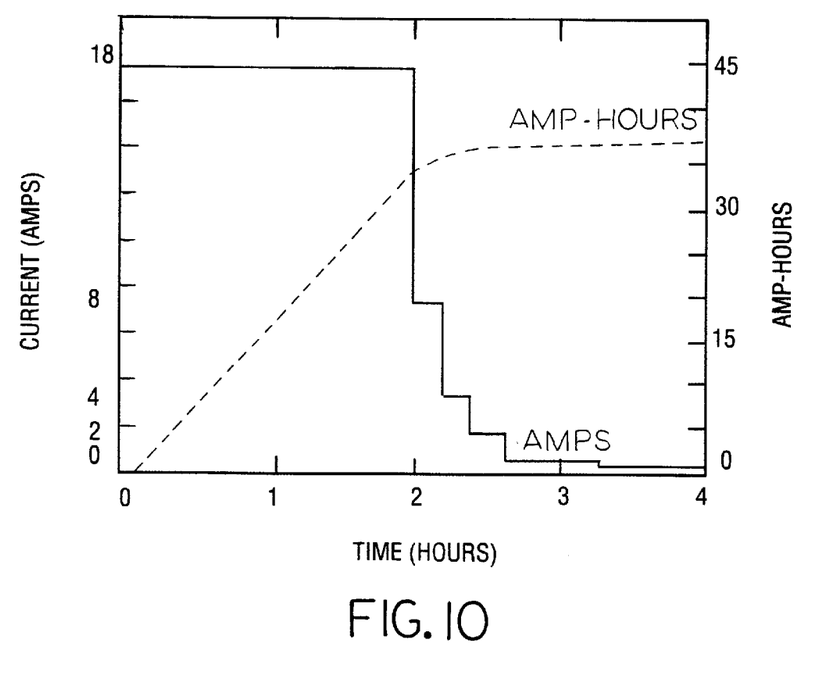
FIG. 10 shows a charging profile with no equalization, 11.5 volts previous discharge and no defective batteries using the invention.
Figure 11:
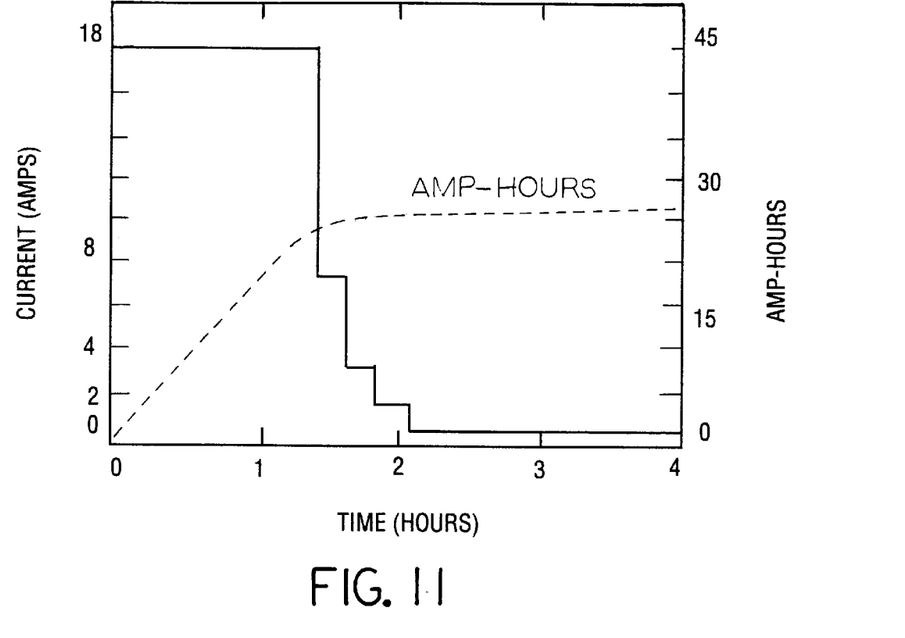
FIG. 11 shows a charging profile with no equalization, 11.5 volts previous discharge and one defective batteries using the invention.
Figure 12:
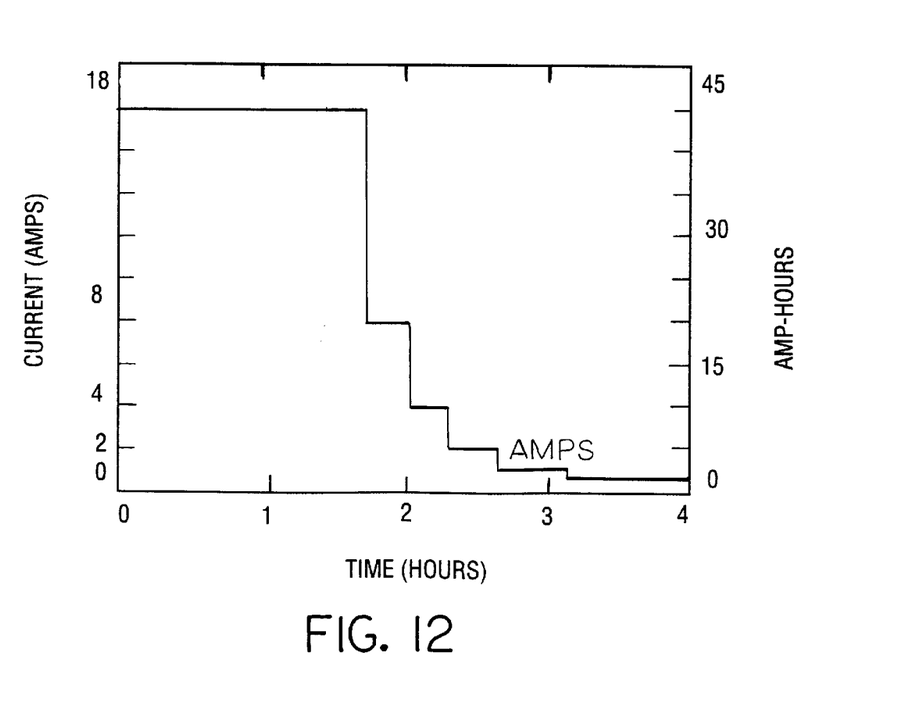
FIG. 12 shows a charging profile with a ramp equalizer, 11.5 volts previous discharge and no defective batteries using the invention.

FIG. 10 shows a charging profile for battery pack 23 with no defective batteries. The charge for this case was about 38 A.H. (amp-hours). FIG. 11 shows the effect of defective battery, $B_{18}$, on the charging profile of FIG. 10. As seen in FIG. 11, the charge decreased to about 26 A.H. from 38 A.H. with no defective batteries. FIG. 12 shows a profile charging using the 30 W ramp equalization circuit 20. As seen in FIG. 12, the charge went back up to almost 34 A.H. This represents an improvement of more than 30% for a 4-hour charge.

Figure 13:
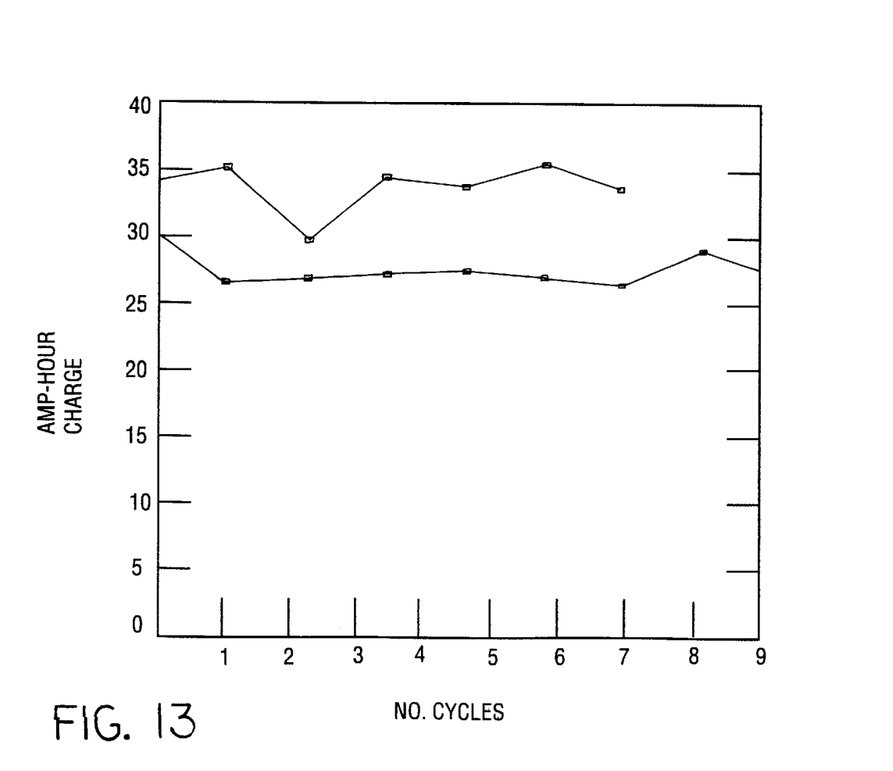
FIG. 13 shows a graph of Amp-hour charge as a function of number of cycles with one defective battery and a maximum charge current of 18 amps using the invention.

FIG. 13 shows a plot of the input charge versus number of cycles with and without the 30 W equalization circuit 20 while defective battery, $B_{18}$, was present. Note that the plot of FIG. 13 shows a pronounced drop when batteries, $B_1, \ldots, B_N$, were left idle for two days after the second cycle. This indicates fairly serious charge leakage even when batteries, $B_1, \ldots, B_N$, were left in a charged state, implying that a small trickle charge would have been beneficial during this period. In spite of the drop in charge due to leakage, equalization circuit 20 was able to balance the battery pack 23 after two cycles. In some cases, unequalized batteries in battery pack 23 actually may behave much worse than the one shown here, and their charge may continue to drop as the maximum and minimum battery voltages drift further apart on each cycle.

The equalization currents in the batteries, $B_1, \ldots, B_N$, were also measured for both the 30 W and 60 W versions of equalization circuit 20, 80 in order to determine the correlation between each equalization current and each battery voltage in batteries, $B_1, \ldots,$ BN. Batteries, $B_1, \ldots, B_N$, in battery pack 23, 83 were all equalized within the tolerance of the measurements ±0.06V, except for one defective battery, $B_X$, whose voltage can be −0.2V below the average voltage of batteries, $B_1, \ldots, B_N$, in battery pack 23, 83. This low voltage battery $B_X$ would typically draw an equalization current of approximately four times greater than the average current for the other batteries, $B_1, \ldots, B_N$, in battery pack 23, 83. Tests with a battery this defective actually represent a rather extreme case, but the close balance for the other batteries and the higher current for the defective battery $B_X$, indicated that the battery equalization circuit 20, 80 of the invention was still very effective.

Figure 14:
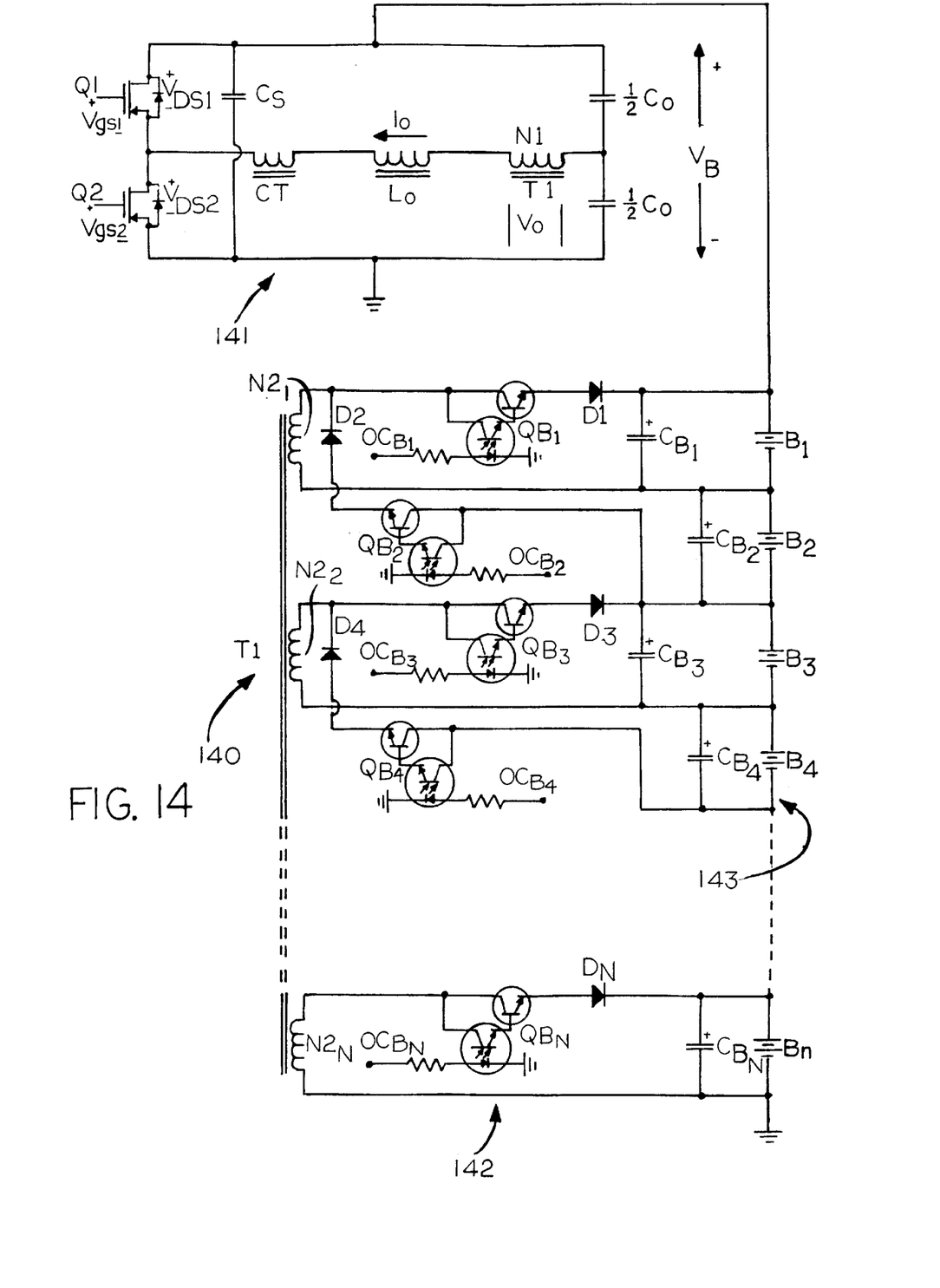
FIG. 14 shows a diagram of the electronic battery equalization circuit according to a third preferred embodiment of the invention.

FIG. 14 shows a diagram of the electronic battery equalization circuit 140 according to a third preferred embodiment of the invention. The third preferred embodiment provides another circuit arrangement that is substantially identical to the electronic battery equalization circuit 20 of the first preferred embodiment, but enhances the performance and lowers the cost.

The electronic battery equalization circuit 20 shown in FIG. 2 draws its power directly from the battery stack and does not require another external power source. Although the electronic battery equalization circuit 20 can re-balance an unbalanced battery stack, the most effective strategy is to use the circuit to maintain balance. In other words, the electronic battery equalization circuit 20 should be used to prevent an imbalance from occurring in the battery stack. This approach greatly reduces the equalizer power level because tests indicate that a circulating power of about 60 W is adequate to maintain voltage balance.

Ideally, in the electronic battery equalization circuit 20, the lowest voltage battery the lowest voltage battery will "hog" substantially all of the secondary current. In reality, the secondary impedances are large enough so that even the high voltage batteries still draw a significant amount of current.

It should be appreciated that equalization depends on the difference in equalizer current between the low and high voltage batteries and is considered to be the most important measure of the effectiveness of any battery equalization circuit. This means that the leakage inductance of the secondary windings, $N_{21}, \ldots, N_{2N}$, must be well-matched, and this increases the cost of the transformer, T1. It also means that a large amount of the output power is simply being circulated in the batteries, $B_1, \ldots, B_N$, and is not aiding equalization.

For example, if the two lowest voltage batteries in a battery stack with 27 batteries draw 200 m.a. each and the other 25 batteries draw 64 m.a., only 136 m.a. (200–64) is being used to equalize these two batteries, even though the total current is 2 Amps. If the equalizer efficiency is 86% and the nominal battery voltage is 15 V.dc., this means that 9.77 W is being dissipated to provide only 4.1 W of equalization power to two batteries. In addition, the equalizer needs to be designed to provide an output power of 60 W.

The electronic battery equalization circuit 140, shown in FIG. 14, is designed to avoid the limitations discussed above. The electronic battery equalization circuit 140 cooperates with the battery voltage monitor 12. Primary circuit 141 is identical to the primary circuit 21 in the first embodiment of the invention. However, secondary circuit 142 includes optically coupled switches, $OC_{B1}, \ldots, OC_{BN}$, connected to a corresponding semiconductor device, $Q_{B1}, \ldots, Q_{BN}$. The optically coupled switches, $OC_{B1}, \ldots, OC_{BN}$, and corresponding semiconductor device, $Q_{B1}, \ldots, Q_{BN}$, is connected to the corresponding output diode, $D_1, \ldots, D_N$, of the secondary circuit 142.

The battery voltage monitor 12 (FIGS. 1 and 15) may include a microcontroller 144 of a type well-known in the art. The optically coupled switches, $OC_{B1}, \ldots, OC_{BN}$, are then electrically connected to the microcontroller 144. Using well-known programming techniques, the microcontroller 144 can be programmed to identify the lowest odd numbered battery, $B_1, B_3, \ldots$, and the lowest even numbered battery, $B_2, B_4, \ldots$, from battery pack 143 and to turn on the corresponding pair of optically coupled switches, $OC_{B1}, \ldots, OC_{BN}$. The switches, $OC_{B1}, \ldots, OC_{BN}$, are changed periodically so that the electronic battery equalization circuit 140 is always connected to the lowest voltage odd-numbered battery, $B_1, B_3, \ldots$, and the lowest voltage even-numbered battery, $B_2, B_4, \ldots$, from battery pack 143.

In the preferred embodiment, the battery voltage monitor 12 may be implemented using a suitably programmed general purpose computer, for example, a microprocessor, microcomputer or other processing device (CPU or MPU), either alone or in conjunction with one or more peripheral data and signal processing devices. However, the battery voltage monitor 12 can also be implemented as a special purpose circuit having a main or central processor section for overall, system-level control, and separate sections dedicated to performing various different specific computations, functions and other processes under control of the central processing section. It will be appreciated by those skilled in the art that the microcontroller 144 also can be implemented using a plurality of separate dedicated or programmable integrated or other electronic circuits or devices, for example, hardwired electronic or logic circuits such as discrete element circuits, or programmable logic devices such as PLDs, PLAs and PALs.

The electronic battery equalization circuit 140 of the third embodiment of the invention has certain advantages over the electronic battery equalization circuit 20 of the first preferred embodiment of the invention.

First, the construction of the transformer, $T_1$, of the electronic battery equalization circuit 140 is less costly than that of the transformer, $T_1$, of the electronic battery equalization circuit 20 because matching the leakage inductance of the secondary windings, $N_{21}, \ldots, N_{2N}$, is no longer necessary.

Second, the electronic battery equalization circuit 140 requires a lower power rating compared to the electronic battery equalization circuit 20. For the above example using 27 batteries, only 272 m.a. of secondary current is required to provide 136 m.a. of equalization current using the electronic battery equalization circuit 140. This means that at 15V, the output power using the third embodiment of the invention is only 4.1 W, instead of the 60 W required in the electronic battery equalization circuit 20 of the first embodiment of the invention. Thus, the electronic battery equalization circuit 140 requires a power rating of only 6–10 W, providing a significant cost reduction compared to the 60 W power rating of the electronic battery equalization circuit 20.

Third, in the electronic battery equalization circuit 20, a defective battery with a continuously low voltage will "hog" most of the current and prevent it from equalizing the other batteries in battery stack 23. However, the electronic battery equalization circuit 140 can be programmed using well-known techniques to prevent connection to batteries below a predetermined voltage. This will allow the vehicle to continue to operate at slightly lower capacity because the microcontroller of battery voltage monitor 12 can also be programmed to detect and ignore a bad battery in battery pack 143.

Figure 15:
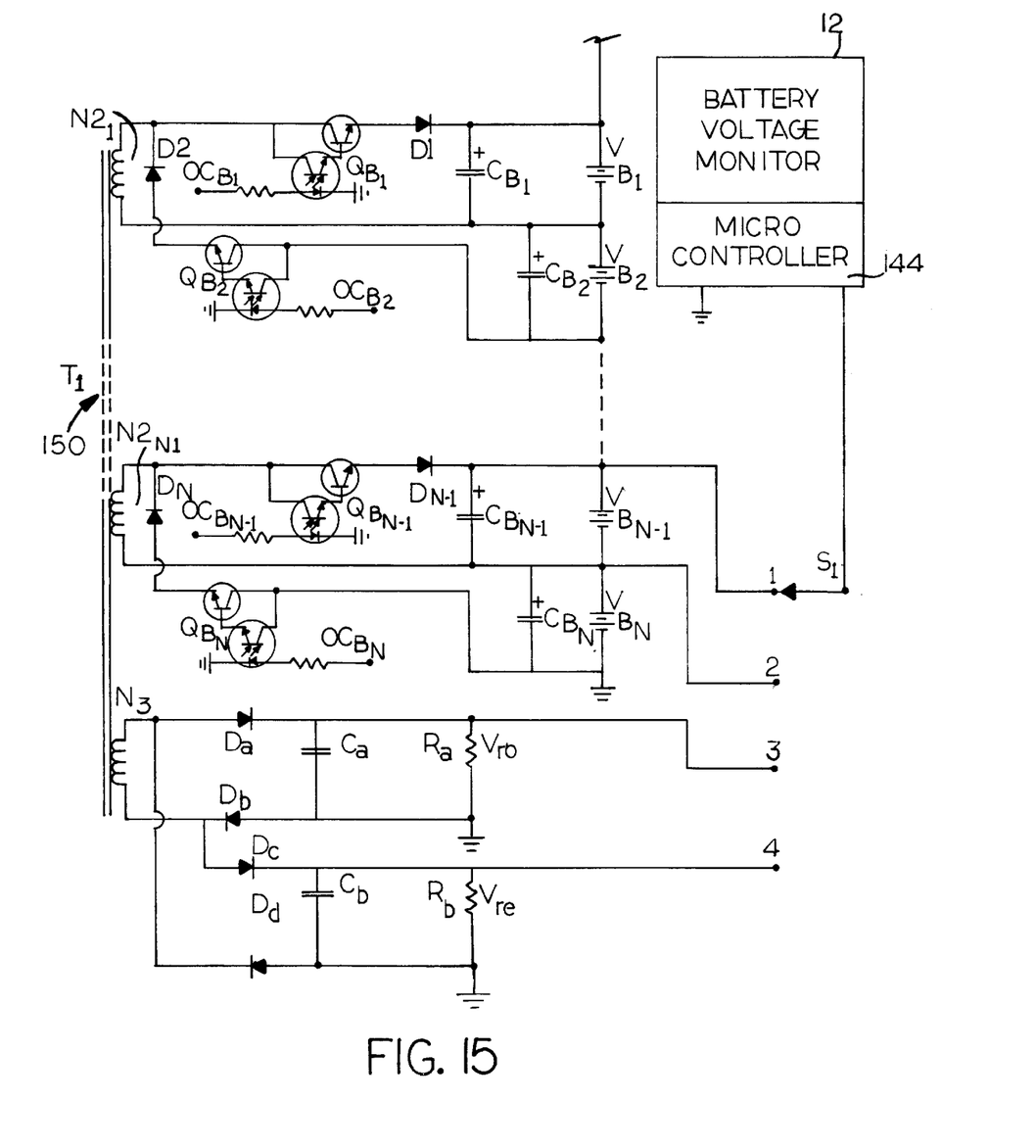
FIG. 15 shows a solid state battery management system according to the third embodiment of the invention.

As shown in FIG. 15, the third embodiment of the electronic battery equalization circuit 140 can also be used to implement the battery voltage monitor 144 to provide a complete solid state battery management system 10. Both circuits would use the same microcontroller 144 of battery voltage monitor 12, and all of the electronics may be implemented with a few integrated circuits.

As with any battery voltage monitor, the circuit 150 of FIG. 15 must be able to isolate measured values of the battery voltages, $V_{B1}, \ldots, V_{BN-1}$, that are not connected to the ground reference of the battery voltage monitor 12. The measured voltages, $V_{ro}$ and $V_{re}$, will be directly proportional to the odd and even numbered battery voltages, that is, $$V_{ro}=k_o V_{Bi}, i=1,3,\ldots,n-1 \qquad (14)$$

$$V_{re}=k_e V_{Bj}, j=2,4,\ldots,n \quad (15)$$

To find the constants, $k_o$ and $k_e$, the microcontroller 144 turns on semiconductor devices, $Q_{BN-1}$ and $Q_{BN}$. All other semiconductor devices, $Q_{B1}$–$Q_{BN-2}$ are off. The microcontroller 144 then sets the solid state switch, S1, to position 1 to measure voltage, $V_x = V_{BN-1} + V_{BN}$, and then to position 2 to measure voltage $V_{BN}$. Switch, S1, is then set to positions 3 and 4 to measure voltages $V_{ro}$ and $V_{re}$, respectively. The microcontroller calculates $k_o$ and $k_e$ as follows:

$$V_{B_{N-1}} = V_X - V_{B_N} \quad (16)$$

$$k_o = V_{ro}/V_{B_{N-1}} \quad (17)$$

$$k_e = V_{re}/V_{B_N} \quad (18)$$

The microcontroller 144 now opens semiconductor devices, $Q_{BN-1}$ and $Q_{BN}$, and closes each pair of odd and even semiconductor devices, for example, $Q_{B1}$ and $Q_{B2}$. Switch, S1, is set to measure battery voltages, $V_{ro}$ and $V_{re}$, and the microcontroller 144 uses the above $k_o$ and $k_e$ to calculate the latest pair of odd and even battery voltages, for example, $$V_{B1} = V_{ro}/k_o \quad (19)$$

$$V_{B2} = V_{re}/k_e \quad (20)$$

It should be appreciated that the invention is not limited by the circuit shown in FIG. 15, and that the invention may be practiced without electrically connecting optically coupled switches, $OC_{B1}, \ldots, OC_{BN}$ to semiconductor devices, $Q_{B1}, \ldots, Q_{BN}$.

In summary, by supplying equalizing current to each half of the battery pack on alternate half cycles, the electronic battery equalization circuit with ramp converter can provide the advantages of soft switching along with a relatively simple transformer. These low losses allow reasonably high switching frequencies, which in turn result in a small physical size. Experimental results confirm that this form of equalization is very effective, and it can be implemented in an economical manner.

In addition, optically coupled switches connected to a microcontroller in a battery voltage monitor provide a complete solid state battery equalization management system that is more reliable and more cost effective than conventional battery equalization circuits.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A battery management system for equalizing voltages a plurality of batteries in a battery pack, comprising:

a battery charger for supplying a charging current to a plurality of batteries in a battery pack during a first half cycle and a second half cycle;

a battery voltage monitor having a microcontroller for monitoring voltages of the plurality of batteries; and a battery voltage equalizer including an electronic battery equalization circuit for equalizing voltages of the plurality of batteries, said electronic battery equalization circuit further comprising:

a transformer connected to said battery charger;

a primary circuit connected to said transformer; and at least one secondary circuit connected to said transformer and including at least one optically coupled switch electrically coupled to the microcontroller of said battery voltage monitor, wherein the microcontroller determines a voltage of the different pair of batteries during the first half cycle and a different pair of batteries during the second half cycle.

2. The battery management system according to claim 1, wherein the microcontroller determines a voltage of the different pair of batteries by comparing the voltage of the different pair of batteries during each half cycle with a reference voltage.

3. The battery management system according to claim 1, wherein the microcontroller supplies charging current to a lowest voltage battery among even-numbered batteries in the battery pack.

4. The battery management system according to claim 1, wherein the microcontroller supplies charging current to a lowest voltage battery among odd-numbered batteries in the battery pack.

5. The battery management system according to claim 1, wherein the charging current is supplied to the plurality of batteries using zero voltage switching.

6. The battery management system according to claim 1, wherein the primary circuit further comprises a negative feedback control circuit coupled to the current transformer.

7. The electronic battery equalization circuit according to claim 6, further comprising a short circuit protection system coupled to said negative feedback control circuit.

8. An electronic battery equalization circuit, comprising:

a current source for supplying a charging current during a first half cycle and a second half cycle;

a transformer connected to said current source;

a primary circuit connected to said transformer, said primary circuit comprising a primary winding, an inductor connected in series to the primary winding, a current transformer connected in series to the inductor and a pair of semiconductor devices; and at least one secondary circuit connected to said transformer, said secondary circuit comprising a secondary winding being coupled to a different pair of batteries of the plurality of batteries, a pair of diodes connected in series, each diode being connected to a different battery of the plurality of batteries, and at least one optically coupled switch electrically connected to the at least one diode of the pair of diodes, wherein the charging current is supplied to a lowest voltage odd-numbered battery in the battery pack during the first half cycle, and wherein the charging current is supplied to a lowest voltage even-numbered battery in the battery pack during the second half cycle.

9. The electronic battery equalization circuit according to claim 8, wherein the charging current is supplied to the plurality of batteries using zero voltage switching.

10. The electronic battery equalization circuit according to claim 8, wherein the primary circuit further comprises a negative feedback control circuit coupled to the current transformer.

11. The electronic battery equalization circuit according to claim 10, wherein said feedback control circuit comprises an error amplifier coupled to the current transformer, a voltage controlled oscillator coupled to the error amplifier and a driver coupled to the voltage controlled oscillator for outputting a drive signal to the pair of semiconductor devices.

12. The electronic battery equalization circuit according to claim 11, wherein the error amplifier compares the charging current to a reference charging current and outputs a signal to the voltage controlled oscillator representing a difference between the charging current and the reference charging current.

13. The electronic battery equalization circuit according to claim 10 further comprising a short circuit protection system coupled to said negative feedback control circuit.

14. The battery equalization circuit according to claim 8, wherein said at least one secondary circuit further comprises a capacitor being connected across the different battery of the plurality of batteries.

15. A method for equalizing voltages of a plurality of batteries in a battery pack using an battery management system comprising a battery charger for supplying a charging current, a battery voltage monitor having a microcontroller and a battery equalization circuit, the battery equalization circuit comprising a transformer connected to the battery charger, a primary circuit connected to the transformer, and at least one secondary circuit connected to the transformer, the secondary circuit comprising a secondary winding being coupled to a different pair of batteries, a diode connected to a different battery, and an optically coupled switch coupled to the battery voltage monitor, the method comprising the steps of:

monitoring a voltage of at least one battery of the plurality of batteries in the battery pack using the microcontroller;

supplying the charging current to a lowest voltage odd-numbered battery in the battery pack during the first half cycle; and supplying the charging current to a lowest voltage even-numbered battery in the battery pack during the second half cycle.

16. A method for charging a plurality of batteries according to claim 15, further comprising the step of comparing the voltage of the odd-numbered battery with a reference voltage during the first half cycle.

17. A method for charging a plurality of batteries according to claim 15, further comprising the step of comparing the voltage of the even-numbered battery with a reference voltage during the second half cycle.

* * * * *